Feb. 13, 1951 G. A. LYON 2,541,080
ENDLESS BELT STRETCHING, TRUING
AND SMOOTHING APPARATUS
Filed April 1, 1946 2 Sheets-Sheet 1
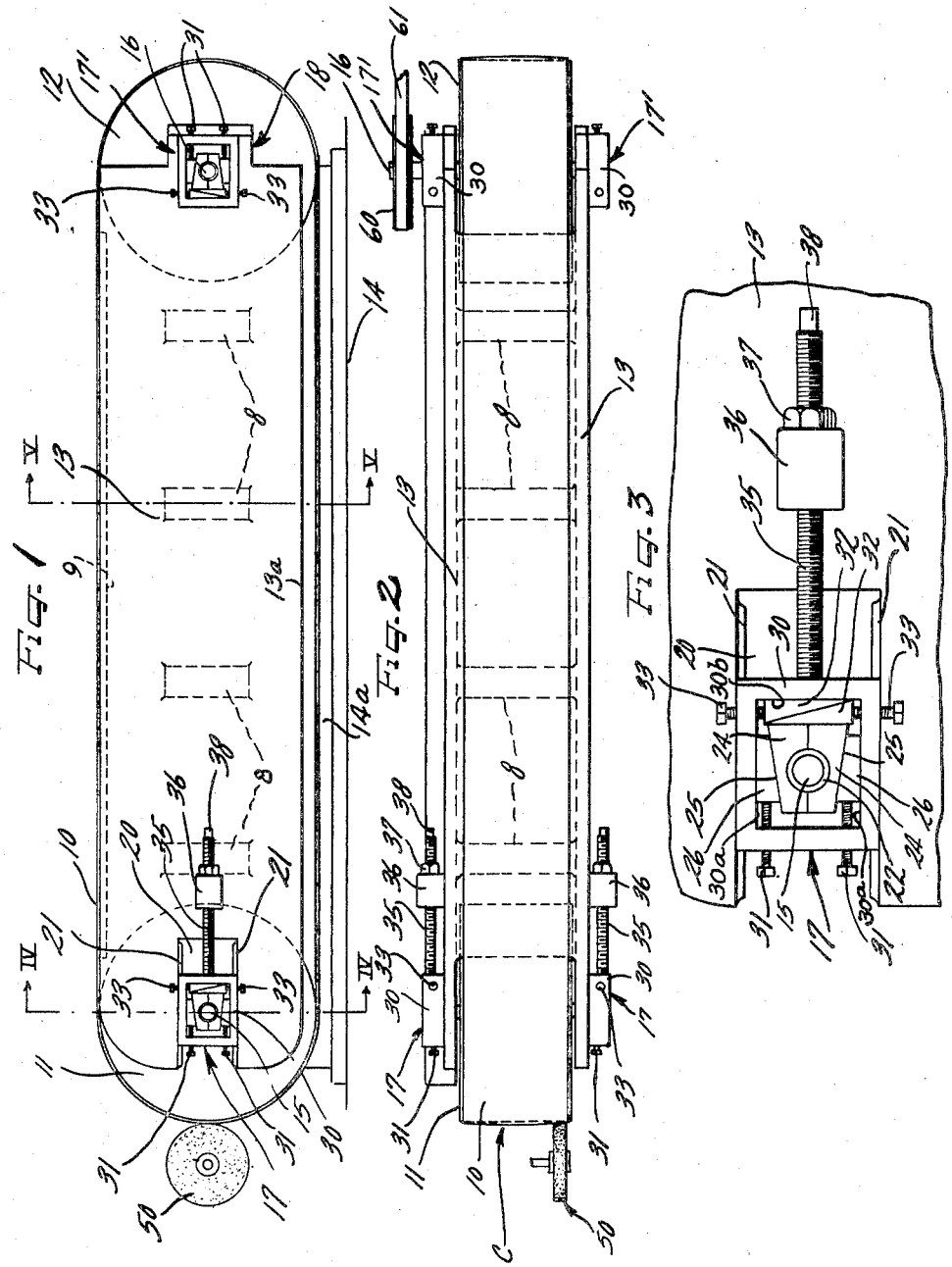
Inventor
GEORGE ALBERT LYON Feb. 13, 1951  G. A. LYON  2,541,080
ENDLESS BELT STRETCHING, TRUING
AND SMOOTHING APPARATUS
Filed April 1, 1946  2 Sheets-Sheet 2

Inventor
GEORGE ALBERT LYON
by The firm of Charles H. Lillis
Attys.

Patented Feb. 13, 1951

2,541,080

UNITED STATES PATENT OFFICE 2,541,080

ENDLESS BELT STRETCHING, TRUING, AND SMOOTHING APPARATUS

George Albert Lyon, Allenhurst, N. J.

Application April 1, 1946, Serial No. 658,712

4 Claims. (Cl. 153—35)

This invention relates to the conditioning of endless sheet metal belts and more particularly to an apparatus for stretching and trueing a stainless steel belt so that it will run perfectly true when used in the fabrication of plastic sheet or the like.

In the manufacture of plastic sheet and the like, it is very important where endless belts are to be used that the belt run perfectly true in order for the tacky plastic to maintain a proper course of travel on the belt.

Now I have observed in the case of sheet steel, such, for example, as stainless steel, manufacturing tolerances are such that it is difficult to get an endless belt made of such sheet steel which is perfectly true and which will run true over rollers or drums carrying the same.

Accordingly, it is an object of this invention to provide a simple but effective apparatus for trueing and lining up an endless sheet metal belt.

Another object of this invention is to provide an apparatus for stretching an endless belt of sheet metal in such a way that at the same time as the belt is being stretched and turned, it can have its external surfaces abraded or ground to remove irregularities, high spots or crowns from the external surface of the belt.

In accordance with the general features of this invention there is provided in an apparatus for stretching and trueing an endless sheet metal belt, rolls at opposite ends of the belt about which the belt is tightly trained, shafts for supporting the rolls, means for driving at least one of the rolls thru its shaft to drive said belt, and means for relatively moving and adjusting said rolls in the direction of the length of the belt to true the belt as it is being turned.

Another feature of the invention relates to the provision of novel bearing blocks for the ends of the roll shafts, each of which bearing blocks includes adjustable wedges so that the end of the shaft therein can be adjusted in both a vertical and horizontal direction.

Still another feature of the invention relates to means for bodily sliding the bearing block back and forth to effect a tensioning or tightening of the belt as desired.

Other objects and features of this invention will more fully appear from the following detailed description taken in connection with the accompanying drawings which illustrate a single embodiment thereof, and in which Figure 1 is a somewhat diagrammatic side view of a belt stretching apparatus embodying the features of this invention;

Figure 2 is a plan view of the structure shown in Figure 1 and illustrating diagrammatically how one of the rolls may be positively driven;

Figure 3 is an enlarged fragmentary side elevational view corresponding to a portion of the left hand end of Figure 1 and showing the wedges of one of the bearing blocks together with the adjusting screw for sliding the bearing block longitudinally;

The illustrated embodiment of the invention is shown as adapted to handle and treat an endless sheet metal belt 10 adapted to be used as a conveyor or the like. This endless belt 10 may be made of any suitable thin sheet metal although I preferably contemplate making it of a thin gauge of stainless steel because of the high degree of polish and luster that such steel can take. In addition, stainless steel as is well known resists corrosion and is ideally suited for the fabrication of synthetic plastic sheet and the like. In fact it is contemplated that the present belt can be used in a plastic forming apparatus, such as that disclosed in my copending application, Serial No. 713,514, filed December 2, 1946, and issued July 18, 1950, as Patent No. 2,515,243.

The endless belt 10 may be of any suitable or desirable length and is trained at its turns or bends over rolls or drums 11 and 12. These drums are rotatably disposed between a pair of horizontally arranged, elongated, substantially coextensive spaced side frame members 13—13' positioned in upright parallel planes upon a common base 14 which may be of a structure that can be cemented or bolted to the floor.

Figure 5:
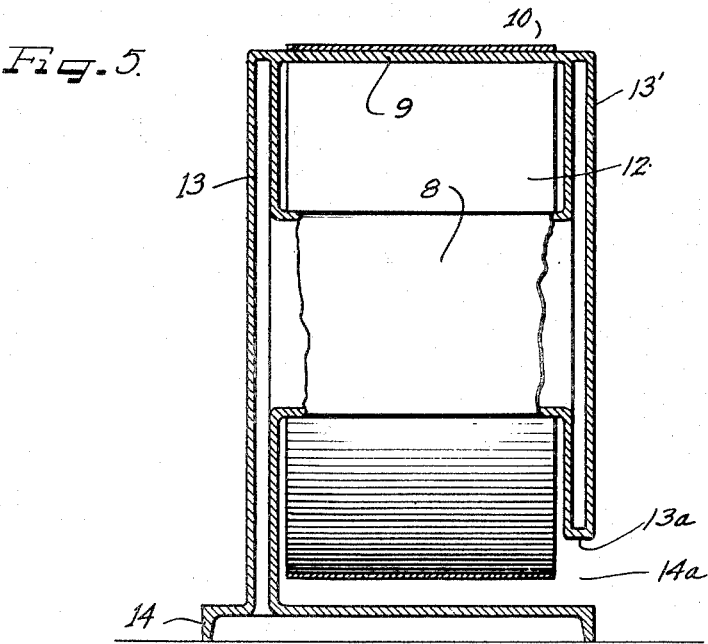
Figure 5 is a vertical sectional detail view taken substantially on the line V—V of Figure 1.

The frame member 13 is mounted at its lower edge fixedly upon the base 14, while the frame member 13' is spaced at its lower edge 13a above the base 14 so as to provide a clearance or gap 14a permitting the belt 10 to be slipped edgewise transversely of the frame members onto the rolls 11 and 12 with the lower leg or run of the belt passing through the gap 14a. The upper edge of the frame member 13' is connected by a top plate 9 to the other frame member 13 so both members are carried by the base 14. Additional cross struts 8 (Figures 1, 2, and 5) also connect members 13—13' to reinforce and rigidify same and provide cantilever support for the frame member 13' from the frame member 13. The top plate 9 serves as a support for the upper leg or run of belt 10 so as to prevent same from sagging.

The rolls or drums 11 and 12 include shafts 15 and 16, respectively, rotatably journaled in end bearing block assemblies 17—17'. These bearing block assemblies 17—17', of which there are four, are all substantailly alike, and hence it is believed that a description of one of the bearing block assemblies 17 will suffice for all. It should be noted that these block assemblies are carried in the frame members 13—13'. The bearing block assemblies 17' are disposed at the right hand end of the frame members 13—13' and extend slightly beyond the normal ends of the frame members which are provided with extensions 18 for retaining the block assemblies in position.

The bearing block assemblies 17' are fixedly carried by the frame members whereas the bearing block assemblies 17, which I shall now describe, are slidably carried in the frame members so as to be adjustable in the direction of the length of the belt 10.

Figure 4:
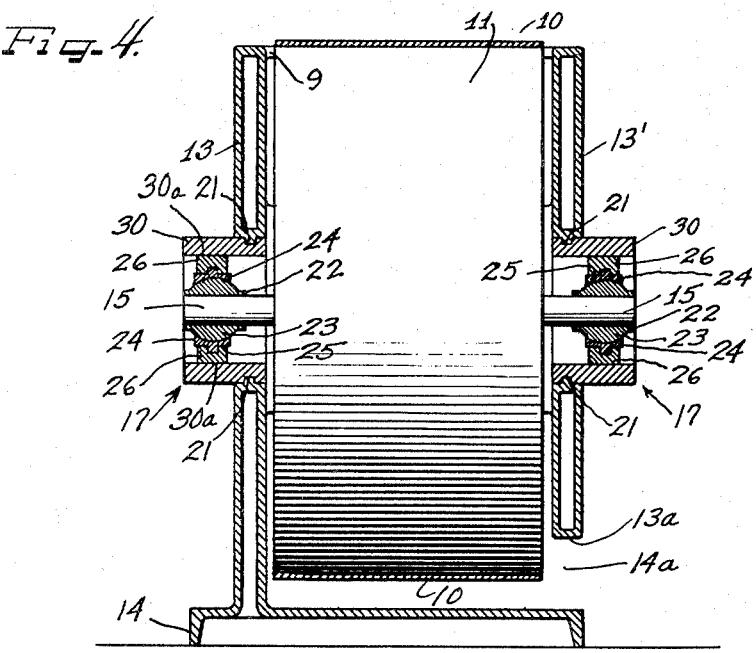
Figure 4 is a vertical sectional detail view taken on the line IV—IV of Figure 1 illustrating the journal block supports for the rolls and showing the curved or generally semi-spherical bearing sleeves for the ends of the roll shaft.

As best shown in Figures 3 and 4, each of the bearing block assemblies 17 is slidably disposed in a transverse slot or guide opening 20 formed in the side frame member 13 or 13', as the case may be. The upper and lower margins of the slide opening 20 are provided with keys or splines 21—21 which slidably retain the block assembly 17 in the opening or guide-way.

The end of the shaft 15 projecting into the block assembly 17 carries a sleeve 22 which has a curved or generally semi-spherical portion 23 journaled in mating wedge-blocks 24 of bearing block assembly 17. In addition to the wedge-blocks 24, each bearing 17 includes cooperating wedge blocks 26 having wedged sliding engagement with the blocks 24—24 at 25—25. It will be noted that the blocks 24—24 are notched out so as to provide curved bearing surfaces for the sleeve 22 as best shown in Figure 4. This enables what might generally be termed "universal" type of support for the end of the shaft in the bearing block assembly 17.

Each of the bearing block assemblies 17—17' also includes a generally rectangular frame 30 in which the wedge-blocks are adjustably carried. The frame 30 provides a pair of opposed spaced parallel ways 30a to which the respective opposite sides of the wedge blocks 24 engaged by the wedge blocks 26 are in opposed spaced relation. Such sides of the wedge blocks 24 are tapered convergent to the ends of the ways 30a adjacent to a third way 30b extending between said ends of the ways 30a. The third way 30b is located at the sides of the respective shafts 15—16 toward which the shafts thrust due to the tension of the belt 10 being trued. The wedge blocks 26 respectively engage the ways 30a slidably.

Adjusting screws 31—31 are provided for each of the blocks 26—26 whereby each of these blocks may be separately adjusted or reciprocated within the frame 30. Thus the wedge-blocks 26 are adjustable in a general horizontal direction to effect cocking or tilting of the corresponding ends of the shaft 15 in accordance with the adjustment required to bring that side of the end of the belt into proper alignment.

Each of the bearing blocks 17—17' also includes a pair of cooperable wedge-blocks 32—32 extending generally vertically and respectively slidably abutting the thrust ends of the blocks 24—24 and the third way 30b. These wedge blocks 32—32 are effective to move the blocks 24—24 in a generally longitudinal direction whereas the blocks 26—26 are adjustable to move the blocks 24—24 in a generally vertical direction.

Each of the blocks 32—32 is provided with an adjusting screw 33 extending through the frame 30 for effecting movement of the associated wedge-block.

It is clear that by adjusting the screws 31—31 and 33—33, it is possible to shift the end of the shaft 15 or 16 in a particular bearing block assembly 17—17' in numerous component directions corresponding substantially to a universal adjustment.

The bearing block assemblies 17' correspond identically with the bearing block assemblies 17—17 at the left hand end of the belt conditioning apparatus with the exception that they are not mounted in guide-ways such as the guide-way 20, but are fixedly carried in the frame members. It is therefore believed that no further description of the bearing block assemblies 17' is necessary.

In addition to the adjustment which is possible by moving the wedge blocks 26—26 and 32—32, the entire bearing block assembly 17 can be bodily shifted back and forth in guide-way 20 by a screw 35. This screw is swivelly anchored at one end to the block frame 30 and projects out of the guide-way, as best shown in Figure 2. The other end of the screw 35 extends through a threaded boss 36 carried by the side frame member 13 or 13', as the case may be. In addition, the screw 35 has a lock nut 37 engageable with the boss 36, to lock the screw in the position to which it is adjusted. The free extremity of the screw 35 is provided with a wrench-engaging portion 38 by means of which the screw can be turned. In effecting this adjustment, the nut 37 is first loosened; and thereafter, upon a turning of the screw 35, the associated bearing block 17 can be bodily moved back and forth in the guide-way 20 as desired. This is true on either side of the shaft 15 inasmuch as identical slidable bearing block assemblies 17—17 are provided at opposite ends of the shaft 15.

I have also illustrated diagrammatically in Figure 2, a pulley 60 connected to the shaft 16 for rotating the shaft and for thus rotating the roll 12 and the belt 10. The pulley 60 may be driven by any suitable prime mover, as by means of a belt 61 or the like. The other roll 15 may be likewise driven if it is so desired.

In adjusting and trueing up the belt 10 the operator may use any suitable gauges, such as level gauges now on the market. First the belt 10 is mounted edgewise over the rolls 11 and 12 and with the lower leg or run of the belt inserted between the base 14 and the edge 13a of the frame member 13'. Then the screws 35—35 are turned to bodily shift the roll 11, as it is being turned, so as to stretch the belt and hold it taut between the two rolls 11 and 12. Thereafter, the wedge-block screws 31 and 33 are adjusted, as the belt is being turned, to bring the web of the belt into perfect trueness.

After the belt has been stretched to a point so that all of its slack is taken out, as well as after it has been trued up by the adjustment of the wedge-blocks, the high spots or other irregularities in the belt, such as the crown shown on an exaggerated scale at C in Figure 2, can be abraded or ground away. In this abrading operation suitable grinding and buffing wheels can be employed. I have illustrated diagrammatically one abrading roll 50 which can be driven by any suitable source of power.

After the belt 61 has been stretched, trued up and ground, the screws 35—35 (Figure 2) can be loosened to move the roll 11 toward the roll 12 and the belt can thereafter be easily removed endwise off of said rolls. In this removal of the belt its upper leg is slid laterally off of top frame plate 9 while the lower belt leg is being slipped laterally outwardly through the gap 14a between the base 14 and the spaced lower edge 13a of side frame member 13'.

I claim as my invention:

1. In combination in an endless belt trueing apparatus of the character described, supporting means providing a pair of opposed spaced parallel ways, a third way extending between the ends of said parallel ways, a pair of separable identical complementary journal wedge blocks assembled together and providing therebetween a journal bearing for a shaft imposing an operating thrust force toward said third way, opposite sides of said journal wedge blocks opposing said parallel ways in respective spaced relation and being tapered convergent to the ends of said parallel ways adjacent said third way, respective wedge blocks adjustably slidably engaging said parallel ways and said tapered journal wedge block sides, and a pair of slidably interengaging adjustment wedge blocks between the third way and the adjacent thrust ends of the journal wedge blocks, one of said interengaging wedge blocks engaging slidably against said third way and the other of said interengaging wedge blocks engaging slidably against said adjacent ends of said journal wedge blocks.

2. In combination in an endless belt trueing apparatus of the character described, a supporting frame having a pair of spaced parallel guide ways, a rectangular frame slidably carried by said guideways and having a portion thereof accessible outwardly of said guide ways both at one end and at the sides of the rectangular frame, means for adjustably sliding said rectangular frame along said guide ways, a pair of separable cooperating journal blocks having complementary opposing bearing portions receptive of a shaft therebetween and each having the opposite side thereof tapered toward an adjacent respective opposing inner side of said rectangular frame, said tapered sides and the ends of said journal blocks being spaced from the respective inner opposing sides and ends of said rectangular frame, respective wedge blocks disposed between the tapered sides of the journal blocks and the adjacent inner opposing sides of said rectangular frame and slidably adjustable, said wedge blocks having adjusting screws threaded through said one end of said rectangular frame, and a pair of cooperating adjusting wedge blocks slidably engaged and slidably engaging as an assembly between the inner side of the opposite end of said rectangular frame and the adjacent ends of said journal blocks, and screws extending through the accessible portion of the rectangular frame sides and operatively connected to said slidably engaging adjusting wedge blocks to slidably adjust the same, the ends of the journal blocks engaged by the adjusting wedge block assembly being adapted to constitute the thrust ends of the journal blocks.

3. In combination in an endless belt trueing apparatus, a pair of horizontally arranged elongated substantially coextensive parallel spaced frame members disposed in upright planes, one of said frame members being mounted at its lower edge fixedly upon a horizontal base, spaced strut members connecting the remaining frame member cantilever fashion to said one frame member, said strut members being disposed substantially inwardly from the respective opposite ends of the frame members, the lower edge of the cantilever-supported frame member being in spaced relation to said base to afford a belt clearance gap, and a pair of belt stretching rolls carried by the end portions of the frame members and with the peripheries thereof disposed to support an endless belt applied thereto by moving the belt edgewise transversely of the frame members past said cantilever-supported frame member and with the lower run of the belt passing through said gap.

4. In combination in an endless belt trueing apparatus, a pair of horizontally arranged elongated substantially coextensive parallel spaced frame members disposed in upright planes, one of said frame members being mounted at its lower edge fixedly upon a horizontal base, spaced strut members connecting the remaining frame member cantilever fashion to said one frame member, said strut members being disposed substantially inwardly from the respective opposite ends of the frame members, the lower edge of the cantilever-supported frame member being in spaced relation to said base to afford a belt clearance gap, a pair of belt stretching rolls carried by the end portions of the frame members and with the peripheries thereof disposed to support an endless belt applied thereto by moving the belt edgewise transversely of the frame members past said cantilever-supported frame member and with the lower run of the belt passing through said gap, and means connected between the upper edge portions of said frame members for supporting the upper run of the belt.

GEORGE ALBERT LYON.

REFERENCES CITED

The following references are of record in the file of this patent:

UNITED STATES PATENTS

| Number | Name | Date |
| --- | --- | --- |
| 509,557 | Roberts | Nov. 28, 1893 |
| 540,309 | Hartwell | June 4, 1895 |
| 562,042 | Shaw | June 16, 1896 |
| 1,047,490 | Blakeslee | Dec. 17, 1912 |
| 1,310,406 | Adams | July 22, 1919 |
| 1,646,056 | Evensen | Oct. 18, 1927 |
| 1,738,520 | Beadle | Dec. 10, 1929 |
| 1,931,062 | Darby | Oct. 17, 1933 |
| 1,953,403 | Harding | Apr. 3, 1934 |
| 2,037,067 | Crossman | Apr. 14, 1936 |
| 2,168,435 | Bond | Aug. 8, 1939 |
| 2,170,308 | Purves | Aug. 22, 1939 |
| 2,180,046 | Gleissner | Nov. 14, 1939 |
| 2,185,481 | Ungerer | Jan. 2, 1940 |